Mar. 13, 1923.
A. KATZINGER
1,448,665
DOUGH HANDLING APPARATUS
Filed Dec. 13, 1920
2 sheets-sheet 1
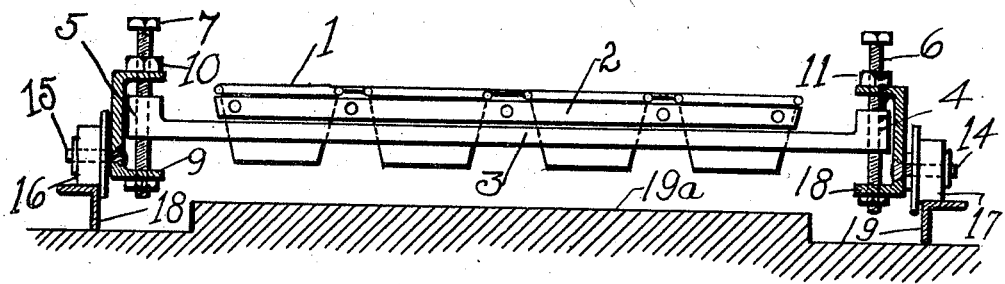
Figure I
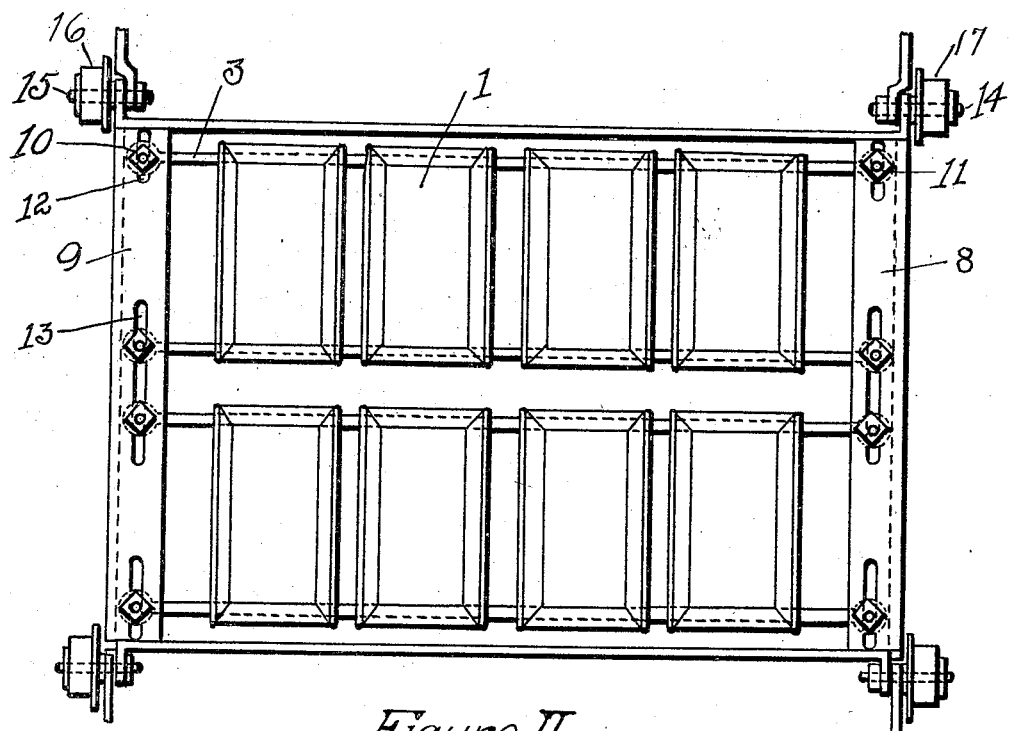
Figure II
Arthur Katzinger,
INVENTOR
BY W. A. Darrah
ATTORNEY Mar. 13, 1923.
A. KATZINGER
1,448,665
DOUGH HANDLING APPARATUS
Filed Dec. 13, 1920      2 sheets-sheet 2
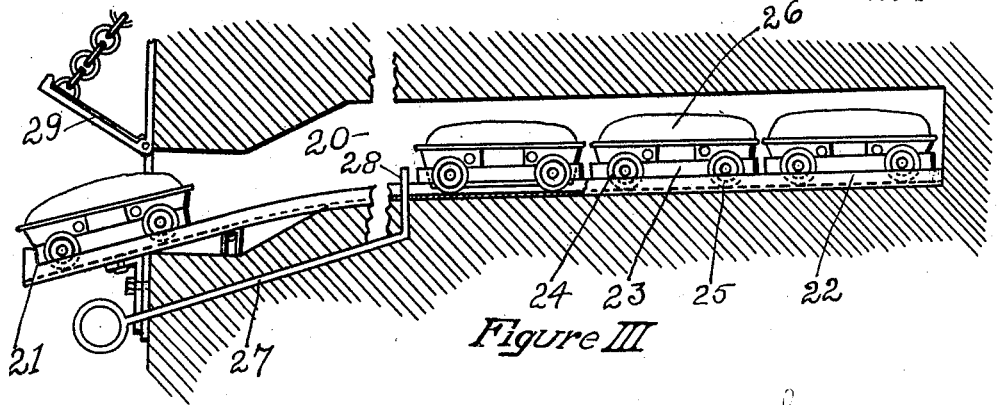
Figure III
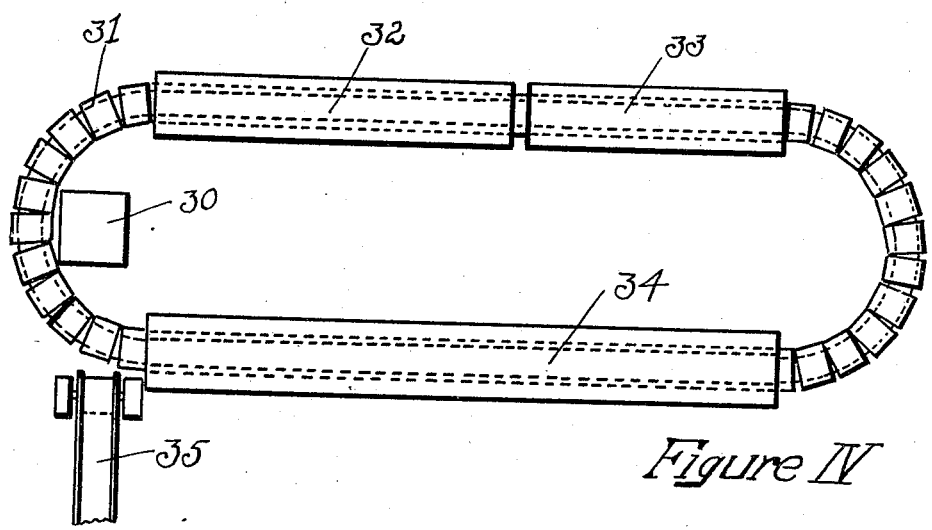
Figure IV
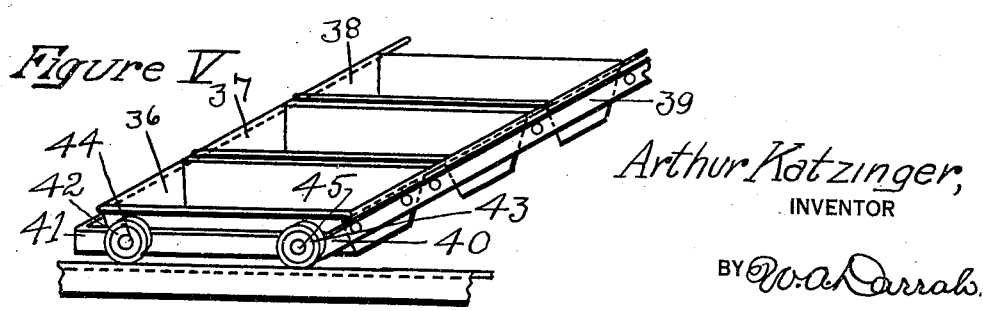
Figure V
Arthur Katzinger,
INVENTOR
BY W. A. Darrah.
ATTORNEY Patented Mar. 13, 1923.

1,448,665

UNITED STATES PATENT OFFICE.

ARTHUR KATZINGER, OF CHICAGO, ILLINOIS, ASSIGNOR TO THE EKCO ENGINEERING COMPANY, OF CHICAGO, ILLINOIS.

DOUGH-HANDLING APPARATUS.

Application filed December 13, 1920. Serial No. 430,577.

*To all whom it may concern:*

Be it known that I, ARTHUR KATZINGER, a citizen of the United States, residing at Chicago, in the county of Cook and State of Illinois, have invented a new and useful Improvement in Dough-Handling Apparatus, of which the following is a specification.

This invention relates to dough pans and similar equipment employed in the handling of dough throughout the bakery, and particularly to equipment employed in baking bread, cake or similar materials.

The object of this invention is to provide simple, cheap and controllable means for handling doughs, reducing labor costs and making it possible to employ unskilled labor in those operations where skilled labor is now essential. Various other objects of this invention will appear from the description and claims which are annexed hereto.

In present bakery practice, it is usual to mix the flour, water and other ingredients in the form of a dough on one of the upper floors of the bakery from whence it is conveyed by a chute or other equipment to a dividing machine, panning apparatus, or other dough handling machinery which may be used.

It is now ordinary practice to place the individual pieces of cut dough by hand or by panning machines into pans or upon baking plates which are then usually placed upon racks or conveyers and given a proofing; after proofing the pans or plates with their dough contents are removed and transferred into the oven by hand; they are then usually removed from the oven individually; the baked material is removed from the pan or plate and the finished product is cooled and wrapped.

It will be obvious that the above operations involve a great deal of manual handling as usually employed, and even in those cases where automatic ovens are used, many manual operations are required.

In order to reduce the amount of human labor required in these various operations, I have invented a system of handling dough which is simple and automatic and which very materially reduces the amount of labor required as well as almost eliminating the demand for skilled labor.

In all commercial bakeries, it is continually necessary to produce varying quantities of different sized loaves having different characteristics and requiring different baking and handling conditions. For example, practically all commercial bakeries produce both one pound and one and a half pound loaves which require varying sizes of pans, and any commercial equipment must be of such form as to quickly and cheaply allow the handling of any desired size and shape of pan. It will, of course, be obvious that in addition to the standard bakery loaves, it is customary to produce "Pullman" loaves, "rye" bread, "sandwich" loaves, "twists," etc., all of which require different sizes and shapes of pans and different baking conditions.

It is also desirable to be able to control the distance between the pan or plate on which the dough is baked and the baking hearth, since the different kinds of dough frequently require different treatment in this respect.

Referring to the drawings, Fig. 1 shows an end elevation partly in section of one form of carrier for handling the pans. Fig. 2 shows a plan view of the same carrier. Fig. 3 shows the application of the modified form of carrier to a standard type of peel oven. Fig. 4 shows schematically the application of the form of carrier illustrated in Figs. 1 and 2 when applied to a complete automatic system, including automatic panning machine, proofer, oven, bread cooler, and conveyer. Fig. 5 shows a detail of a modified form of carrier of a type well adapted for use with a peel oven.

Referring to Fig. 1, 1 represents the bread pans which are preferably fastened together in groups of 4 to 8, forming a single unit; any well known, thoroughly substantial method of attaching the pans is satisfactory. I have shown here a set of 4 pans fastened together by straps 2 which rest upon cross member 3 which carries nuts 4 and 5 at its respective ends. Nuts 4 and 5 are arranged to be raised or lowered by turning bolts 6 and 7 which are separated in channels 8 and 9 and locked in place by lock nuts 10 and 11 respectively. Bolts 6 and 7 pass through series of elongated slots 12 and 13 which permit of longitudinal movement of said bolts thus varying the spacing between cross members 3 and accommodating the carrier to different sizes and shapes of pans.

Channels 8 and 9 are provided with axles 14 and 15 which carry wheels 16 and 17 allowing the carrier to move along tracks 18 and 19. 19ª indicates the baking surface of the oven.

In operation the carriers will be linked together to form a train or endless band so that moving one carrier will move the entire train.

In Fig. 3, the carriers are substantially similar in construction to detail shown in Fig. 5. Referring to Fig. 3, 20 indicates the baking space of the peel oven. Tracks 21 which may well be made of channel or angle iron, are upon the floor 22 of the oven. The groups of pans, of which 23 is typical, are provided with wheels 24 and 25 adapted to co-operate with track 21; 26 illustrates a loaf of bread in said oven; 27 indicates a movable stop which is adapted to prevent the pans from sliding out of the oven while baking. By rotating the stop 27, the tip 28 may be withdrawn from contact with the pan, thus allowing the withdrawal of the contents of the oven. 29 indicates a door for closing the oven during the baking period.

Referring to Fig. 4, 30 indicates diagrammatically a panning machine or the station of the workmen who place the dough upon the pan; 31 indicates one of a series of carriers upon which the pans are placed; 32 indicates schematically a proof box through which the cars travel after leaving the panning machine. After passing through proofing chamber 32, the cars are carried through baking chamber 33, after which the pans may be removed, if desired, and the bread then continues on the carriers through cooling tunnel 34 at the exit end of which may be located a conveyer 35 adapted for carrying cooled loaves to the shipping room or wrapping machine. It will, of course, be understood that the arrangement of equipment illustrated in Fig. 4 is merely diagrammatic, as many other forms or modifications may be employed and still come within the scope of this invention.

Referring to Fig. 5, 36, 37 and 38 represent pans which are held together by strap 39. Strap 39 has extensions 40 and 41 beyond a series of pans, and wheels 42 and 43 are carried by axles 44 and 45, supported by extensions 40 and 41.

It will be obvious from the above description that the invention here described allows the economic handling of a wide range of different sizes and shapes of pans or plates and that by the raising or lowering of cross member 3, it is possible to vary the distance between the bottom of the pan 1 and the baking surface of the oven 19ª.

It will also be evident that when pans are provided with wheels 24 and 25, as illustrated in Fig. 3, it is usually possible to load an ordinary peel oven in a small fraction of the time which is at present required. For example, in a standard peel oven, as now used, it requires on an average of 5½ minutes to load the oven and approximately two minutes to unload the oven. This means a total of about 7½ minutes during which time the oven is idle, and also means that the loaves placed in the rear portion of the oven are baked 7½ minutes longer than those placed in the forward portion of the oven. Obviously this condition is not conducive to the production of a uniform quality of bread. In the same way, considerable skill is required in loading a peel oven and only a trained man can be entrusted with this operation. On the contrary, by the use of the equipment here disclosed, any laborer can quickly load and unload the peel oven, thus materially reducing the delay involved, securing a much more uniform product and reducing the labor cost.

When applied to the continuous type of oven as illustrated in Fig. 4, it will be obvious that this invention not only eliminates the necessity for all skilled labor, but insures absolute uniformity of proofing, baking and cooling, as well as insuring a high and continuous production. The advantages resulting from these features are obvious, including such factors as increased output, decreased labor and reduced investment in bakery equipment.

Another advantage which is of considerable importance in any pan equipment is the ability of pans to nest. It will be noted that in the case of the carriers described in Figs. 1 and 2, groups of pans may be so designed as to nest readily, while in the modified form shown in Fig. 5, nesting is as readily possible.

It should be clearly understood that while I have described certain definite forms in this specification and shown specific examples in the drawing, that many modifications of these forms are possible without departing from the spirit of this invention.

Having now fully described my invention, what I claim as new and wish to secure by Letters Patent in the United States is as follows:—

1. A pan support consisting of a horizontally disposed frame carried upon rollers and equipped with transversely arranged supporting members, said supporting members being adjustably attached to said horizontally disposed frame, the adjustment of said supporting members being such as to raise and lower the members or to move the members horizontally.

2. A pan support consisting of a horizontally disposed frame carried upon rollers and provided with transversely arranged supporting members provided with adjusting means for varying the distance between said supporting members and the furnace floor as well as the distance between said supporting members.

3. A pan supporting device consisting of a frame arranged for longitudinal motion, equipped with screw-supported, transverse members capable of adjustment in a longitudinal plane.

4. A pan supporting device consisting of a horizontally disposed single-deck frame arranged to travel in close proximity to the oven floor, and screw supported pan holding members arranged to permit fractionally varying the distance between said pan supporting members and the oven floor.

5. A pan supporting device consisting of a horizontally disposed frame mounted upon rollers, slotted portions in said frame, and transverse pan supporting members co-operating with said slotted members to permit adjustment between said supporting members and between said supporting members and the oven floor.

6. A pan supporting device consisting of a channeled frame horizontally disposed, vertically arranged screw members supported by slots in said channel, and pan supporting members adjustably carried by said screw members.

ARTHUR KATZINGER.